May 24, 1938.　　　C. C. FARMER　　　2,118,398
FLUID PRESSURE BRAKE DEVICE
Filed Sept. 20, 1934
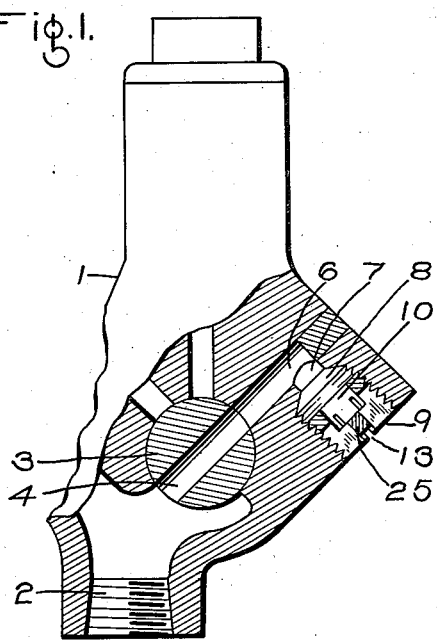
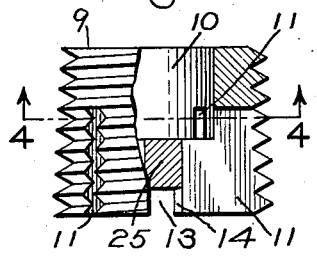
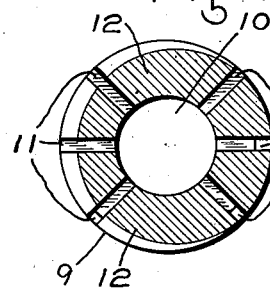
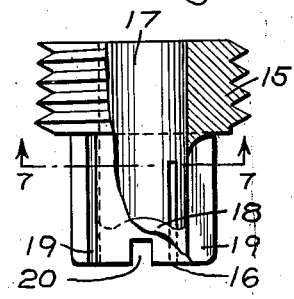
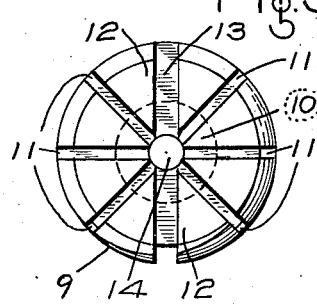
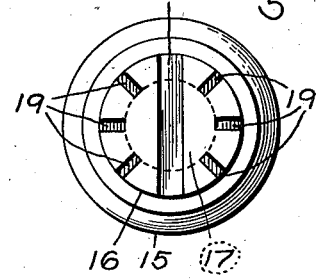
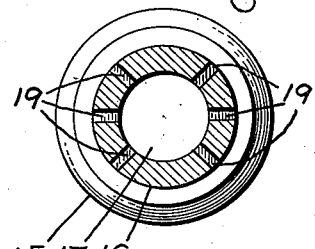
INVENTOR
CLYDE C. FARMER
BY
ATTORNEY Patented May 24, 1938

2,118,398

UNITED STATES PATENT OFFICE 2,118,398

FLUID PRESSURE BRAKE DEVICE

Clyde C. Farmer, Pittsburgh, Pa., assignor to The Westinghouse Air Brake Company, Wilmerding, Pa., a corporation of Pennsylvania Application September 20, 1934, Serial No. 744,804

4 Claims. (Cl. 303—1)

This invention relates to fluid pressure brakes, and more particularly to retaining valve devices of the character employed on railway cars for controlling the release of fluid under pressure from the brake cylinder on the cars.

The usual retaining valve device is provided internally with vent passages which lead to an atmospheric exhaust passage of larger diameter than the internal passages, and this atmospheric exhaust passage is screw-threaded to receive the screw-threaded pipe stud of a pressure gage, so that a pressure gage may be mounted on the retaining valve device for ascertaining certain leakage conditions of the brake equipment.

Insects, such as mud wasps, often enter the retaining valve device through the screw-threaded exhaust passage and travel into the smaller diameter vent passages within the device and there build a nest, the screw-threaded exhaust passage apparently being too conspicuous and too large in diameter for this purpose. These nests often seal up the vent passage in the device, so that when a car is in service, the wasp nests prevent the release of brakes, which often results in sliding or otherwise damaging the wheels on a car.

It has heretofore been proposed to obviate the above difficulty by providing an exhaust fitting adapted to be screwed into the atmospheric exhaust opening of a retaining valve device and having means for preventing the entrance of insects into the internal passages of the retaining valve device, but such fittings have generally been of a type which was provided with a portion extending beyond the contour of the retaining valve device and have, therefore, been subject to breakage due to inadvertent blows or from the use of improper tools, such as a pipe wrench, in applying or removing the fittings from a retaining valve device. When the fittings extend out from the retaining valve device, they are also subject to clogging from dust, dirt, snow, sleet, and the like, and furthermore, are conspicuous and therefore liable to become stolen, particularly if the fittings are made from brass or some other metal which resists corrosion.

The principal object of the invention is to provide an improved exhaust fitting which will be contained wholly within the atmospheric exhaust opening of a retaining valve device, so as to obviate the above difficulties.

In the accompanying drawing, Fig. 1 is a view, partly in section, of a retaining valve device with one form of the improved exhaust fitting applied thereto; Fig. 2 is an enlarged side elevational view of the exhaust fitting shown in the retaining valve device shown in Fig. 1, but with a portion broken away to more clearly show the construction; Fig. 3 is a plan view of one end of the exhaust fitting shown in Fig. 2; Fig. 4 is a sectional view taken on the line 4—4 in Fig. 2; Fig. 5 is a side elevation, with a portion broken away, of another form of exhaust fitting; Fig. 6 is a plan view of one end of the fitting shown in Fig. 5; and Fig. 7 is a sectional view taken on the line 7—7 of Fig. 6.

As shown in Fig. 1 of the drawing, the retaining valve device is of the usual construction, comprising a casing 1 having a screw-threaded passage 2 adapted to be connected to the usual retaining valve pipe on a car. A plug valve 3 is rotatably mounted in the casing and is provided with a port 4 adapted at one time to establish communication from the screw-threaded passage 2 to vent passages 6 and 7, the passage 7 opening into the usual screw-threaded exhaust passage 8 which is of larger diameter than that of passages 6 and 7 and which leads directly to the atmosphere. An exhaust fitting 9 constructed in accordance with one form of my invention is shown screw-threaded into the exhaust passage 8.

The exhaust fitting 9 is made in the form of a plug having external screw-threads over its full length, which is somewhat less than the length of the screw-threaded portion of the exhaust opening 8 in the retaining valve device, said fitting being screwed into said opening until it is contained wholly within the retaining valve device, that is, until the outer end of the fitting is at least flush with the outer surface of the casing 1.

The fitting 9 is provided with a counterbore 10 in the end which is first inserted in the exhaust opening 8, and a plurality of radial slots 11 are cut through the other end of the fitting to a depth such as to open into the counterbore 10, so as to establish an exhaust communication from said counterbore 10 which opens directly to the exhaust passages 6 and 7 in the retaining valve device, through the fitting to the outer end thereof and thereby to the atmosphere.

The slots 11 are provided by cutting through the end of the fitting with a saw. To form the six exhaust slots 11 shown in the drawing, requires three saw cuts which are preferably spaced 45° apart, as clearly shown in Figs. 2, 3 and 4 of the drawing. It will be noted that by spacing the saw cuts as just described, two diametrically opposite segments 12 are provided on the outer end of the fitting. These segments are substantially twice the size of the other segments between the slots, and diametrically through the center of the end of these segments 12 is provided a slot 13 of such width and depth as to receive the end of a screw driver for applying and removing the fitting to and from the retaining valve device 1. The screw driver slot 13 does not open into the counterbore 10, and the segments 12 provide sufficient strength to prevent distortion of the fitting when applying and removing said fitting to and from the retaining valve device.

In forming the slots 11 an axial opening is made through the fitting from the outer end thereof to the counterbore 10. This axial opening is liable to be of such size as to permit wasps or the like to enter the counterbore and from thence travel on into the interior of the retaining valve device. In order to prevent such entry of wasps, an axial bore 14 of larger size than the opening made by forming slots 11 is provided through the fitting from the outer end thereof into the counterbore 10, and a plug 25 is then pressed into bore 14 to such a depth as to be below the bottom of the screw driver slot 13. In addition to excluding wasps, the plug 25 also has the function of strengthening the segments between the slots 11, so as to better resist distortion while fittings are being handled, as well as when being applied to or removed from a retaining valve device.

The width of the slots 11 is such as to prevent the entrance of wasps or the like into the retaining valve device, and the combined flow capacity of the six slots is greatly in excess of that required to permit the desired rate of release of air from the brake cylinder on a car.

Since the fitting when applied to a retaining valve device is contained wholly therein, it is protected against damage from inadvertent blows and from the use of improper tools, such as a pipe wrench, which otherwise might be used to apply it or remove it from the retaining valve device. Being entirely enclosed within the retaining valve device, the fitting is also protected against becoming clogged with foreign matter, such as dust, snow, and sleet, and is also inconspicuous, so that in case it is made from a valuable metal, such as brass, it is not liable to become stolen.

The exhaust fitting shown in Figs. 5, 6 and 7, is functionally the same and is similar in construction to that shown in Figs. 1 to 4, as above described. This fitting is provided with screw threads only on the portion 15 which is adapted to first enter the exhaust passage 8 of the retaining valve device. The outer portion 16 of the fitting is cylindrical in shape and of smaller diameter than the inner portion 15, but the overall length of this fitting is such that when applied to the exhaust passage 8 of the retaining valve device, it will be enclosed entirely within said device, as described in connection with the fitting 9.

An axial bore 17 is provided in the exhaust fitting shown in Fig. 5, said bore being open at the outer surface of the inner portion 15 of the fitting and extending to a wall 18 provided in the outer end of the outer portion 16 of the fitting. Six slots 19 are cut lengthwise through the wall of the outer portion 16 from the end thereof to the junction with the inner portion 15 of the fitting, these slots opening into bore 17, thereby forming a communication from bore 17 to the space outside of and around the outer portion 16 of the fitting.

The slots 19 are arranged so that three on one side of the fitting are spaced preferably 45° apart and diametrically opposite three on the opposite side, while at right angles to the middle slot of the three, a slot 20 is cut across the outer closed end of the outer portion 16 of the fitting, the slot 20 being of such width and depth as to receive a screw driver for applying and removing the fitting to and from a retaining valve device, but the slot 20 does not open into the axial bore 17. When this fitting is applied to a retaining valve device, the exhaust of fluid under pressure in releasing the brakes on a car will occur through the bore 17, slots 19 to the space formed between the outer surface of the portion 16 of the fitting and the exhaust opening 8, and from thence to the atmosphere. This fitting, like the fitting 9, being adapted to be entirely enclosed within the retaining valve device, will be protected against damage from blows and the use of improper tools, will also be protected against clogging from dust, snow, sleet and the like, and being inconspicuous, will not be liable to become stolen.

It will be noted that the counterbore 10 in the exhaust fitting shown in Figs. 1 to 4, and the bore 17 in the exhaust fitting shown in Figs. 5 to 7, open to the interior of the retaining valve device when applied thereto, while the slotted ends of said fittings, as shown in Figs. 3 and 6, respectively, are exposed to insects and the elements. This is an important feature in both forms of fittings, for it positively precludes the entrance of insects into the fitting itself.

While two embodiments of the invention have been described in detail, it is not the intention to limit the scope of the invention to these embodiments or otherwise than by the terms of the appended claims.

Having now described my invention, what I claim as new and desire to secure by Letters Patent, is:

1. In a fluid pressure brake, a valve device comprising a casing having a fluid pressure outlet passage and a screw-threaded opening leading from said passage to the atmosphere, an exhaust fitting disposed wholly within said opening, and having screw-threaded engagement for its full length with said casing, said fitting having a counterbore open to said passage, a plurality of slots extending diametrically through the outer end and adjacent side portion of said fitting and opening into said counterbore, a screw driver slot extending diametrically through the outer end of said fitting and spaced from said counterbore, said slots, including said screw driver slot, being arranged so that angular spacing is substantially uniform, said fitting having a bore extending through the outer end to said counterbore at the point of convergence of said slots, and a plug disposed in said bore below the bottom of said screw driver slot.

2. An exhaust fitting for the exhaust port of a fluid pressure brake device or the like comprising a body adapted to be disposed in said port and having screw-threads for screw-threaded engagement with said device, said body having a chamber open at one end of the body, a screw driver slot extending diametrically through the other end of said body, said body having an axial bore extending from the bottom of the screw driver slot to said chamber, a plug disposed in said bore, and a plurality of narrow diametrically disposed slots in said body extending from the screw driver slot end of the body and opening into said chamber.

3. An exhaust fitting for the exhaust port of a fluid pressure brake device or the like comprising a body adapted to be disposed in said port and having screw-threads for screw-threaded engagement with said device, said body having a chamber open at one end of the body, a screw driver slot extending diametrically through the other end of said body, said body having an axial bore extending from the bottom of the screw driver slot to said chamber, a plug disposed in said bore, and a plurality of narrow diametrically disposed slots in said body extending from the screw driver slot end of the body and opening into said chamber, said slots being substantially uniformly spaced with respect to each other and with respect to said screw driver slot.

4. An exhaust fitting for the exhaust port of a fluid pressure brake device or the like comprising a body adapted to be disposed in said port and having screw-threads for screw-threaded engagement with said device, said body having a chamber open at one end of the body and having a partition wall between said chamber and the other end, a diametrically disposed screw driver slot provided in said wall, and a plurality of relatively narrow, radially disposed slots in said body at each side of said screw driver slot and extending from the screw driver slot end of said body to said chamber.

CLYDE C. FARMER.